M. RUCKES.
BALANCE BALL FOR SCALES.
APPLICATION FILED SEPT. 6, 1907.
921,285.
Patented May 11, 1909.
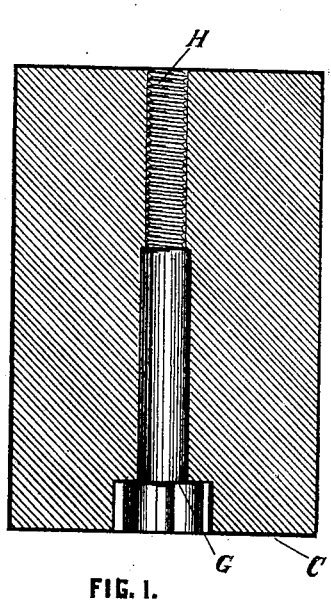
FIG. 1.
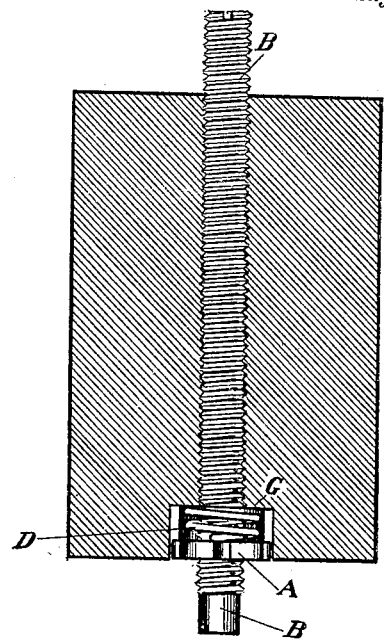
FIG. 2.
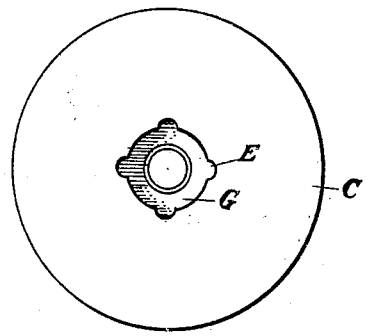
FIG. 3.
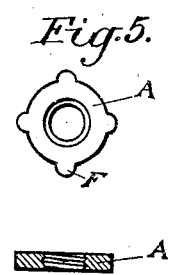
FIG. 5.
FIG. 4.
WITNESSES:
P. A. Williams
E. H. Powley
INVENTOR.
Michael Ruckes
BY
John H. Roney
ATTORNEY.

UNITED STATES PATENT OFFICE.

MICHAEL RUCKES, OF BEAVER FALLS, PENNSYLVANIA.

BALANCE-BALL FOR SCALES.

No. 921,285.      Specification of Letters Patent.      Patented May 11, 1909.

Application filed September 6, 1907. Serial No. 391,609.

*To all whom it may concern:*

Be it known that I, MICHAEL RUCKES, a citizen of the United States, residing at Beaver Falls, in the county of Beaver and State of Pennsylvania, have invented a new and useful Improvement in Balance-Balls for Scales, of which improvement the following is a specification.

My invention relates to improvements in weighing scales and particularly to the balance ball in use thereon.

The object of my invention is to prevent the balance ball when adjusted at any point, from being disturbed accidentally, and to accomplish this purpose, consists in the novel construction and arrangement of parts hereinafter described, reference being had to the accompanying drawings, forming part hereof, in which—

Figure 1 is a longitudinal section of the ball. Fig. 2 is the same showing the threaded rod on which the ball is movably mounted; also the mechanism for holding the ball thereon against movement. Fig. 3 is an end view of same. Figs. 4 and 5 are details of securing washer.

Referring to said drawings, C is a balance ball in which, longitudinally thereof, is formed an orifice H, one end of which is screw threaded and the opposite end terminates in an enlarged portion G in which the washer A and the spiral spring D are seated, the said enlarged portion conforming in cross section to the configuration of said washer A, being provided with grooves in the walls thereof which receive the projections F on said washer for the purpose of preventing said washer from turning in said orifice. The said washer and spring are mounted on one end of the threaded rod B on which the balance ball is movably mounted.

I claim as my invention and desire to secure by Letters Patent:

1. A balance ball for weighing scales having a centrally disposed orifice longitudinally thereof and a recess at one end of said orifice in combination with a threaded shaft on which said ball is movably mounted, a washer mounted on one end of said shaft and seated in said recess, a spring mounted on said shaft between said washer and the bottom of said recess.

2. A balance ball for weighing scales, having a centrally disposed orifice longitudinally thereof, terminating at one end in an enlarged portion or recess in the sides of which grooves are formed, a threaded shaft on which said ball is movably mounted, a washer seated in said recess and having projections adapted to fit in the grooves in the sides thereof, a spiral spring mounted on said shaft between the bottom of said recess and said washer, the constant pressure of which against the bottom of said recess and said washer holds said ball to any point to which it may be adjusted on said shaft.

In testimony whereof, I have hereunto signed my name in the presence of two subscribing witnesses.

MICHAEL RUCKES.

In the presence of—
     ALMOND R. LEYDA,
     JOHN H. THUSMAN.